United States Patent [19]
Zielinska et al.

[11] Patent Number: 6,003,383
[45] Date of Patent: Dec. 21, 1999

[54] VORTEX FLUID METER INCORPORATING A DOUBLE OBSTACLE

[75] Inventors: Barbara Zielinska, Palaiseau; Souad Zikikout, Paris, both of France

[73] Assignee: Schlumberger Industries, S.A., Montrouge, France

[21] Appl. No.: 08/718,179

[22] Filed: Sep. 19, 1996

[30] Foreign Application Priority Data

Mar. 23, 1994 [FR] France .................................. 94 03406
Mar. 20, 1995 [FR] France .................... PCT/FR95/00339

[51] Int. Cl.[6] ....................................................... G01F 1/32
[52] U.S. Cl. ....................................................... 73/861.22
[58] Field of Search ............................. 73/861.22, 861.24

[56] References Cited

U.S. PATENT DOCUMENTS

| | | | |
|---|---|---|---|
| 4,142,407 | 3/1979 | Kuroiwa et al. ...................... | 73/861.22 |
| 4,453,416 | 6/1984 | Knudsen .............................. | 73/861.22 |
| 4,891,989 | 1/1990 | Misumi et al. ...................... | 73/861.22 |
| 5,052,229 | 10/1991 | Tanimura et al. .................... | 73/861.22 |
| 5,150,619 | 9/1992 | Turner et al. ........................ | 73/861.22 |
| 5,398,548 | 3/1995 | Ono ..................................... | 73/861.22 |
| 5,569,859 | 10/1996 | Gatzmanga et al. ................. | 73/861.22 |

*Primary Examiner*—George M. Dombroske
*Assistant Examiner*—Jewel V. Artis
*Attorney, Agent, or Firm*—Leonard W. Pojunas

[57] ABSTRACT

A vortex fluid meter (1) includes a pipe portion (2) of constant inside diameter in which the fluid flows, at least two obstacles disposed in the middle of the flow of the fluid in said pipe portion (2) each having a generally elongate shape with longitudinal and transverse dimensions perpendicular to the direction of flow of the fluid, and adapted to generate oscillatory fluid vortices, an upstream obstacle (4) having a substantially uniform trapezoidal transverse section and a downstream obstacle (6) having a generally T-shape transverse section, and means (10, 12, 14) for detecting the signal corresponding to the oscillations of said vortices and for deducing therefrom the fluid volume or flowrate.

26 Claims, 8 Drawing Sheets

VORTEX FLUID METER INCORPORATING A DOUBLE OBSTACLE

FIELD OF THE INVENTION

The present invention concerns a vortex fluid meter including at least two obstacles adapted to generate oscillating fluid vortices and producing a substantially constant Strouhal number for low Reynolds numbers.

BACKGROUND OF THE INVENTION

Vortex fluid meters or flowmeters are widely known and usually comprise a pipe along which there flows a fluid whose volume and/or flowrate are to be measured. An obstacle is placed in the fluid flow inside the pipe so that when the fluid flow meets said obstacle fluid vortices are generated and separate from the obstacle in an oscillatory manner. This kind of meter also includes means for determining the volume of fluid from these oscillations. These means are usually on the obstacle. The principle of measuring the fluid volume in this type of meter is based on the fact that the frequency of oscillation of the vortices is approximately proportional to the speed of the fluid in the pipe and the aforementioned means detect a signal corresponding to the oscillations of said vortices. This signal can be a differential pressure, for example.

The purpose of a vortex fluid meter is to provide an accurate and reliable measurement of the flowrate or the volume of the fluid flowing through the pipe for wide ranges of Reynolds numbers. To this end the Strouhal number (the ratio of the product of the oscillation frequency multiplied by the obstacle diameter to the speed of the fluid) must be constant for varying Reynolds numbers (the ratio of the product of the fluid speed multiplied by the pipe diameter to the dynamic viscosity of the fluid). Recent research in this field has lead to the design of vortex fluid meters with optimized obstacle shapes and dimensions and that are totally satisfactory for high Reynolds numbers, for example Reynolds numbers in the order of 260,000.

Patent application EP-A-0 408 355 describes a vortex flowmeter including a pipe in which the fluid flows, a double obstacle disposed in the flow of fluid and means for measuring the frequency of separation of the vortices generated by said double obstacle.

The double obstacle comprises an elongate first or upstream obstacle whose upstream face is convex and whose downstream face is plane, and a second or downstream obstacle remote from the first and whose upstream face is plane and whose downstream face is concave or plane. In the case of a gas, flowmeters of this kind are not suitable for measuring Reynolds numbers less than 146,000 and in particular less than 33,000. At high Reynolds numbers the shear layers that develop at the lateral edges of the obstacle separate and form fluid vortices whose flow is turbulent and the corresponding Strouhal number is relatively constant. At low Reynolds numbers, however, the shear layers become progressively laminar, the vortices form more quickly, the oscillation frequency of the vortices falls more slowly than the speed of the fluid, and the Strouhal number rises quickly, introducing error into the fluid volume measurement.

SUMMARY OF THE INVENTION

The present invention is directed to overcoming these drawbacks by proposing a vortex fluid meter for which the Strouhal number is substantially constant at low Reynolds numbers of the fluid and also substantially constant at high Reynolds numbers of the fluid in order to enhance the performance of said meter over a wide range of Reynolds numbers.

The present invention comprises a vortex fluid meter including:

a pipe portion of constant inside diameter D in which the fluid flows, at least two obstacles, i.e. an upstream obstacle and a downstream obstacle disposed in the middle of the fluid flow in said pipe portion and adapted to generate main fluid vortices in an oscillatory manner, each of said obstacles having a generally elongate shape with longitudinal and transverse dimensions perpendicular to the direction of flow of the fluid, and means for detecting the signal corresponding to the oscillations of said vortices and for deducing therefrom the volume of fluid, characterized in that the upstream obstacle of longitudinal dimension h has two larger faces perpendicular to the direction of flow of the fluid and spaced by a distance t, an upstream face of transverse dimension d greater than the transverse dimension of the downstream face, and two symmetrical smaller lateral faces each at an angle $\beta$ to said upstream face, the downstream obstacle being in two parts joined together in a T-shape configuration, the first part with longitudinal dimension h and transverse dimension l having two parallel larger faces, i.e. an upstream face parallel to the downstream face of said upstream obstacle and at a distance $d_1$ from the latter and a downstream face, and two smaller faces, the second part having two larger faces with the same dimensions and parallel to the direction of flow of the fluid and two parallel smaller faces with the same dimensions and perpendicular to the direction of flow of the fluid.

When the flow of fluid encounters the upstream obstacle, a shear layer is formed alternately on either side of the lateral faces of said upstream obstacle which, at low speeds, becomes progressively laminar.

At low Reynolds numbers of the fluid the vortex fluid meter of the invention destabilizes the shear layer which layer separates from the upstream obstacle, becomes unstable and rolls up to form turbulent vortices, the effect of which is to make the Strouhal number substantially constant.

In accordance with other characteristics of the invention:

the ratio d/t lies in the range 4 to 8, the angle $\beta$ lies in the range 30 degrees to 70 degrees, the distance $d_1$ lies in the range d/4 to 3d/4, the width l lies in the range 0.8d to 1.2d, the ratio d/D lies in the range 0.15 to 0.3, the larger faces of the first part of the downstream obstacle are separated by a distance in the range 0.02d to 0.08d, the smaller faces of the first part of the downstream obstacle are parallel, the smaller faces of the second part of the downstream obstacle have a transverse dimension in the range 0.02d to 0.08d, each of the two larger faces of the second part of the downstream obstacle has a dimension parallel to the direction of flow of the fluid in the range 0.8d to 1.2d.

The vortex fluid meter according to the invention advantageously further includes means for reducing the effect of turbulence caused by horseshoe-shape permanent fluid vortices generated by part of the fluid flow corresponding to the boundary layer of the latter encountering the upstream obstacle.

The means for reducing the effect of turbulence caused by permanent fluid vortices comprise two bases each having at least one larger face perpendicular to the longitudinal dimension of the upstream obstacle and the downstream obstacle and each of said bases is attached to the pipe portion in such a way as to have a maximum longitudinal dimension or thickness e facing the boundary layer of the flow of fluid, said upstream obstacle and downstream obstacle being fixed by one of their opposite longitudinal ends to each larger face of a base in such a way that each base has a portion upstream of the upstream obstacle. The thickness e of each base lies in the range 0.03D to 0.05D. Each base portion has an upstream end at a distance from the upstream face of the upstream obstacle in the range 0.1d to 0.4d.

According to another very advantageous characteristic of the invention the vortex fluid meter further includes means for separating the main oscillatory fluid vortices from the permanent secondary fluid vortices generated by part of the fluid flow corresponding to the boundary layer of the latter encountering the upstream obstacle.

The means for separating the main oscillatory fluid vortices from the secondary fluid vortices are formed by two passages or free spaces between the second part of the downstream obstacle and the pipe portion of inside diameter D, on either side of the opposite longitudinal ends of said second part which are spaced by a distance less than h. Each free space has a maximum longitudinal dimension in the range D/40 to D/20.

The pipe portion of inside diameter D is preferably connected at the upstream end to an upstream pipe portion whose inside diameter increases progressively in the upstream direction to a value D1 and having an inside wall at a continuously varying angle to the direction of flow of the fluid, said angle having a null value at places in the pipe where the diameter of said upstream portion is respectively equal to D and to D1 and is connected at the downstream end to a downstream pipe portion having an inside wall which diverges sharply at a constant angle a to the direction of flow of the fluid in the range 9 degrees to 20 degrees, changing from the inside diameter D to the diameter D1. The diameter D lies in the range 60% to 90% of the diameter D1. The pipe portion of inside diameter D has a length in the range 1.5 times to 3 times said inside diameter D. The upstream face of the upstream obstacle is at a distance from the upstream pipe portion in the range 0.5D1 to D1.

In accordance with other characteristics of the invention:
the means for detecting the signal corresponding to the oscillations of the vortices and for deducing therefrom the volume of fluid include a plate disposed in the middle of the flow of fluid downstream of the downstream obstacle and in the pipe portion of inside diameter D, said plate having a longitudinal dimension D perpendicular to the direction of flow of the fluid and a constant rectangular cross-section defined by two lateral larger faces parallel to the direction of flow of the fluid and upstream and downstream smaller faces, two parallel longitudinal main passages formed in said plate near said upstream face, each main passage being connected to one only of said lateral faces by a plurality of evenly distributed perpendicular secondary passages, and a sensor connected to the main passages and to an electronic circuit for deducing the volume of fluid from the said detected signal, the upstream face of the plate has a transverse dimension in the range 0.1 times to 0.4 times the transverse dimension d of the upstream face of the upstream obstacle, the upstream face of the plate is at a distance from the upstream face of the upstream obstacle in the range 3d to 7d, the main passages have a diameter slightly smaller that the transverse dimension of the upstream face of the plate and said main passages are offset in the direction of flow of the fluid, the sensor is a pressure sensor or a heat sensor.

Other characteristics and advantages of the invention will emerge from the following description given by way of non-limiting example only with reference to the appended drawings, in which:

DETAILED DESCRIPTION

Figure 1:
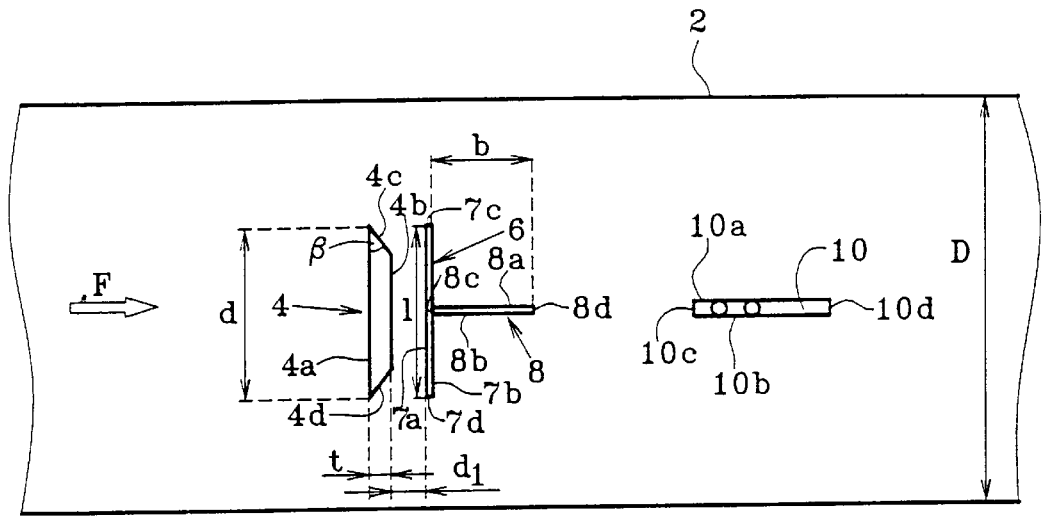
FIG. 1 is a diagrammatic view of a first embodiment of vortex gas meter in accordance with the invention in section on a plane containing the axis of symmetry of the pipe.
Figure 2:
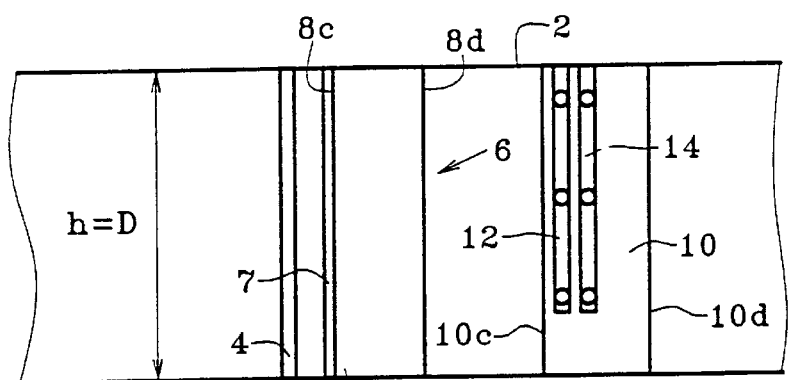
FIG. 2 is a diagrammatic view of the meter shown in FIG. 1 in section on a plane containing the axis of symmetry of the pipe and perpendicular to the plane of FIG. 1.

As shown in FIGS. 1 to 10, the vortex fluid meter 1 of the invention is a gas meter, for example. A meter of this kind includes a pipe portion 2 inside which there flows the gas whose volume is to be measured. As shown in FIGS. 1 and 2 the pipe portion 2 has a constant inside diameter D.

The vortex gas meter of the invention also includes two obstacles 4 and 6, namely an upstream obstacle 4 and a downstream obstacle 6, disposed in the pipe portion 2 in the middle of the flow of gas. The gas meter could include more than two obstacles. Each obstacle is of generally elongate shape in a longitudinal direction which is perpendicular to the direction of flow of the gas and has a transverse dimension or width which is also perpendicular to the direction of flow of the gas.

As shown in FIG. 1 the obstacles have respective cross-sections which are substantially uniform in their longitudinal direction. This cross-section is contained within a plane parallel to the direction of flow of the gas and perpendicular to the longitudinal direction of the obstacles. The upstream obstacle 4 has a longitudinal dimension or height h which is equal to D and has two larger faces 4a and 4b which are both perpendicular to the direction of flow of the gas and spaced by a distance t. The larger face 4a is called the upstream face and has a transverse dimension d and the other larger face 4b is called the downstream face and has a transverse dimension less than d. The ratio d/t is advantageously in the range 4 to 8. For example, it is equal to 5.5. The upstream obstacle 4 also has two smaller lateral faces 4c and 4d which are symmetrical about a median plane parallel to the direction of flow of the gas and perpendicular to the plane of FIG. 1. Each of the faces 4c and 4d is at the same angle β to the upstream face 4a. The angle β lies in the range 30 degrees to 70 degrees. For example, it is equal to 58 degrees. The cross-section of the upstream obstacle is therefore trapezium-shaped with the longer base on the upstream side.

It is very important that the angle β should be as small as possible, firstly so that the upstream face 4a of the upstream obstacle has the sharpest possible edges at which the shear layers of the flow of gas are formed alternately, and secondly so that the edge has sufficient mechanical strength. The shear layers then separate and form oscillating vortices. If the angle β and the distance t are too large the shear layers may adhere to the lateral walls 4c and 4d of the upstream obstacle which could impede the development of the shear layer and thereby impede the formation of the vortices. On the other hand, if the angle β is approximately less than 30 degrees the obstacle is too thin to have sufficient mechanical strength to withstand the flow of gas.

The downstream obstacle 6 is in two parts. The first part 7 has a longitudinal dimension h equal to D and has two parallel larger faces 7a and 7b with the same transverse dimension l. The upstream face 7a is parallel to and at a distance $d_1$ from the downstream face 4b of the upstream obstacle 4, leaving an intermediate space between the two obstacles. The downstream face 7b is at a distance from the upstream face 7a which lies in the range 0.02d to 0.08d. For example, it is equal to 0.06d. Two parallel lateral smaller faces 7c and 7d which are parallel to the direction of flow of the gas impart a rectangular shape to the cross-section of the first part of the downstream obstacle.

In another embodiment of the invention that is not shown the two lateral smaller faces 7c and 7d are at the same angle to the upstream face 7a. This angle lies in the range 30 degrees to 70 degrees and imparts a trapezium shape to the first part 7 of the downstream obstacle 6. In this case the first part 7 of the downstream obstacle 6 and the upstream obstacle 4 have not necessarily exactly the same shape. The second part 8 of the downstream obstacle has a longitudinal dimension h equal to D and has two parallel larger faces 8a and 8b which are the same size and parallel to the direction of flow of the gas.

Two parallel smaller faces 8c and 8d of the second part 8 of the downstream obstacle 6 are perpendicular to the direction of flow of the gas and impart a rectangular shape to the cross-section of said second part of the downstream obstacle. The two smaller faces 8c and 8d have a transverse dimension in the range 0.02d to 0.08d, for example 0.06d. With a transverse dimension less than 0.02d the mechanical stiffness of the second part of the downstream obstacle 6 is insufficient. Each of the larger faces 8a and 8b has a dimension b (length) parallel to the direction of flow of the gas in the range 0.8d to 1.2d. It is equal to d, for example. The two parts 7 and 8 previously described are assembled in such a way as to impart a T-shape to the cross-section of the downstream obstacle 6. At one sharp edge of the upstream obstacle 4 the shear layer that forms, separates and then wraps on itself to form a vortex downstream of the downstream obstacle 6. At the same time as this shear layer forms on the lateral face 4c of the upstream obstacle 4, the flow of gas is aspirated into the intermediate space between the two obstacles 4 and 6 from the opposite side of said upstream obstacle, i.e. from the lateral face 4d, and is expelled from the side on which the shear layer forms after the vortex is formed. Unsteady motion of the gas occurs immediately downstream of the first part 7 of the downstream obstacle 6 facing the larger faces 8a and 8b of the second part 8 of said downstream obstacle. This motion corresponds to a phenomenon of recirculation which helps to disrupt the laminar structure of the shear layer and to destabilize it so that it becomes turbulent.

It is therefore very important that the distance $d_1$ between the two obstacles 4 and 6 is chosen carefully so that the respective phenomena of aspiration of the flow of gas into the intermediate space and recirculation occur simultaneously and fully. The distance d between the two obstacles must therefore be in the range d/4 to 3d/4. If it is greater than 3d/4 vortices tend to form in the intermediate space but their formation is disturbed by the presence of the downstream obstacle 6. on the other hand, if this distance is less than d/4 virtually no aspiration of the flow of gas into the intermediate space occurs, cancelling out the benefit of the two obstacles, and the recirculation phenomenon has virtually no effect.

Similarly, to prevent unwanted recirculation at the lateral smaller faces 7c and 7d the faces 7a and 7b of the first part 7 of the downstream obstacle 6 must not be more than 0.08d apart and to prevent a reduction in the amplitude of the unsteady motion of the gas facing the larger faces 8a and 8b of the second part 8 of said downstream obstacle 6 the transverse dimension of the second part 8 of the downstream obstacle 6 must not be greater than 0.08d.

The Applicant has found that if a disturbance from the upstream side propagates in the flow of gas towards the two obstacles it is advantageously not amplified (as the person skilled in the art might expect) but is instead controlled by the recirculation phenomenon.

Figure 3:
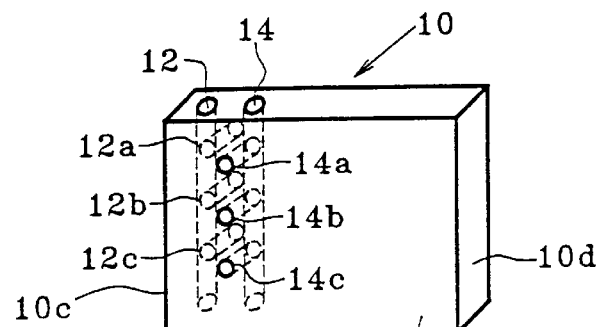
FIG. 3 is a diagrammatic perspective view to a larger scale of the plate 10 of the vortex gas meter shown in FIGS. 1 and 2.

As shown in FIGS. 1 to 3 the vortex gas meter 1 also includes means 10 for detecting the signal corresponding to the oscillations of the vortices and deducing therefrom the volume of gas. The person skilled in the art knows how to deduce a gas flowrate directly from the detected signal corresponding to the oscillations of the vortices. These means include a plate member 10 in the pipe portion 2 in the middle of the flow of the gas. The plate 10 has a longitudinal dimension D corresponding to its height and which is perpendicular to the direction of flow of the gas. The plate 10 has two parallel larger faces 10a and 10b parallel to the direction of flow of the gas called the lateral faces and two parallel smaller faces 10c and 10d perpendicular to said larger faces and respectively called the upstream face 10c and downstream face 10d. As shown in FIGS. 1 and 3, these faces confer a rectangular shape on the cross-section of the plate 10 which is constant in the heightwise direction.

The plate 10 and in particular the transverse dimension of the upstream face 10c which lies in the range 0.1d to 0.4d, for example equal to 0.2d, constitutes an obstacle with sharp edges causing separation of the flow of the gas on contact with said upstream face 10c, also called the leading edge, creating an area of turbulence alternately in contact with each of the lateral faces 10a and 10b of said plate 10. The creation of this turbulent area tends to enhance the quality of the information conveyed by the vortices.

The upstream face 10c of the plate is advantageously at a distance from the upstream face 4a of the upstream obstacle 4 in the range 3d to 7d to recover the best possible signal from the oscillation of the vortices.

The Applicant has discovered, surprisingly, that when the vortices encounter the plate 10 an acoustic wave is generated and propagates upstream, disturbing the structure of the shear layer and thereby accentuating the turbulent nature of the vortices at low gas speeds.

Two parallel main passages 12 and 14 run longitudinally through the plate 10 near the upstream face 14c. The passages 12 and 14 extend into the plate 14 from its upper part a distance less than the height D of said plate. A plurality of secondary passages 12a, 12b, 12c and 14a, 14b, 14c are spaced along the longitudinal dimension of the main passages 12 and 14 to connect each of said main passages perpendicularly to one only of the lateral faces 10a, 10b of the plate 10.

For example, each main passage 12 (14) is connected to one lateral face 10a (10b) of the plate 10 by three secondary passages 12a, 12b, 12c (14a, 14b, 14c) whose diameter is substantially equal to that of the main passages. The two main passages 12, 14 are connected by a hose to a heat sensor (not shown), for example, which detects the flow due to the differential pressure induced in the passages by the oscillation of the vortices. The sensor can instead be a pressure sensor.

Figure 15:
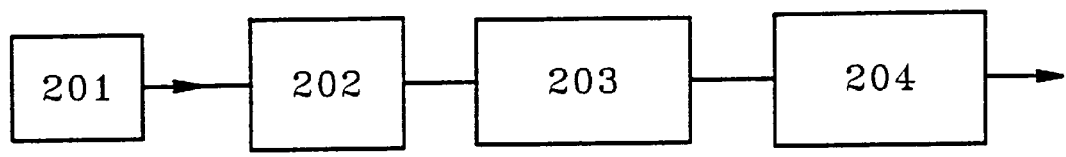
FIG. 15 is a simplified circuit schematic of an electronic circuit for determining the volume of gas from the detection of the differential pressure.

FIG. 15 is a simplified block diagram of an electronic circuit which, from the detection of the differential pressure by the sensor 201, successively delivers through the amplifier means 202 an alternating current signal at the input of a peak detector 203, by means of said peak detector, converts this alternating current signal to an impulse signal in which each pulse represents a unit volume of gas and, using a counter 204, counts the number of pulses to obtain a volume of gas.

Figure 16:
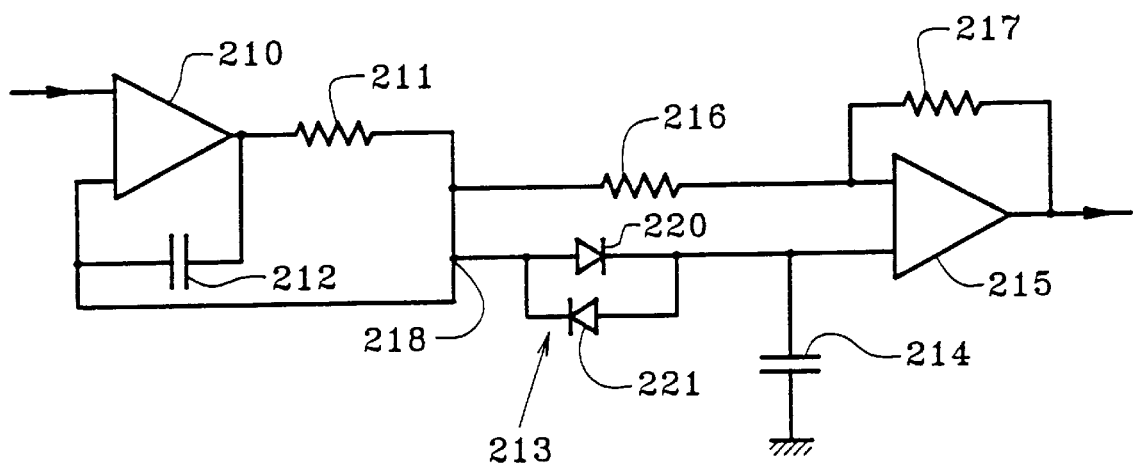
FIG. 16 shows a peak detector used in the FIG. circuit.

As shown in FIG. 16, a peak detector 203 includes, for example, an amplifier 210 with a resistor 211 and a capacitor 212, a threshold device 213 including two diodes 220, 221 connected in reverse parallel, a capacitor 214 providing a memory function, a differential amplifier 215 and resistors 216, 217. Each diode 220, 221 can be the junction of a field-effect transistor.

The amplifier 210, the resistor 211 and the capacitor 212 isolate the signal at the input of the capacitor 214. Each diode has its own threshold and exhibits a voltage drop when conducting (on). If the amplitude of the signal at the point 218 rises above the threshold of the diode 220 the diode is turned on and the value of the voltage at the point 218 less the voltage drop of the diode 220 is stored in the capacitor 214. The differential amplifier 215 compares the voltage at the point 218 with the voltage across the capacitor 214 and outputs a high signal if the voltage at the point 218 is greater than the voltage across the capacitor 214.

When a peak is reached and the signal amplitude falls the difference between the value of the signal at the point 218 and the value of the signal stored by the capacitor 214 falls below the threshold of the diode 220 and the diode 220 is turned off. This fixes the value of the signal stored in the capacitor 214. When the amplitude of the signal at the point 218 falls below the value of the signal stored by the capacitor 214 the amplifier 215 supplies a low signal showing that a peak has occurred. When the value of the signal falls below the value of the signal stored in the capacitor 214 by an amount corresponding to the threshold of the diode 221 the latter is turned on and the value of the signal stored in the capacitor 214 drops with the value of the signal at the point 218 reduced by the voltage drop of the diode 221. When a negative peak is reached and passed the diode 221 is turned off again and the amplifier 215 will indicate a change of state when the signal at the point 218 rises above the value of the signal stored in the capacitor 214.

Figure 17:
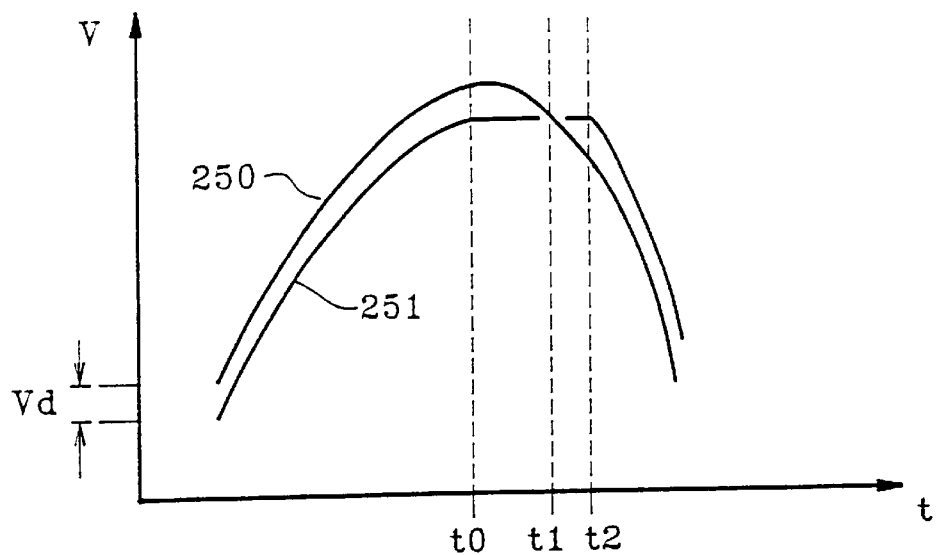
FIG. 17 shows the peak detection operation carried out on a peak by the FIG. 16 peak detector.

FIG. 17 shows the variation in the voltage of the first signal at the point 218 (curve 250) and the variation in the capacitor voltage (curve 251). The capacitor voltage 251 is initially equal to the voltage of the signal 250 less the value Vd corresponding to the voltage drop of the diode 220 and the amplifier 215 supplies a high signal. When a peak is reached at time to and the voltage of the signal 250 falls below the threshold value of the diode 220 the capacitor voltage 251 is fixed. At time t1 the voltage of the signal 250 falls below the voltage 251 stored in the capacitor and the output of the amplifier 215 supplies a low signal. At time t2 the difference between the voltage of the signal 250 and the voltage stored in the capacitor is greater than the value of the threshold of the diode 221 and the capacitor voltage tracks the voltage of the first signal.

Figure 18:
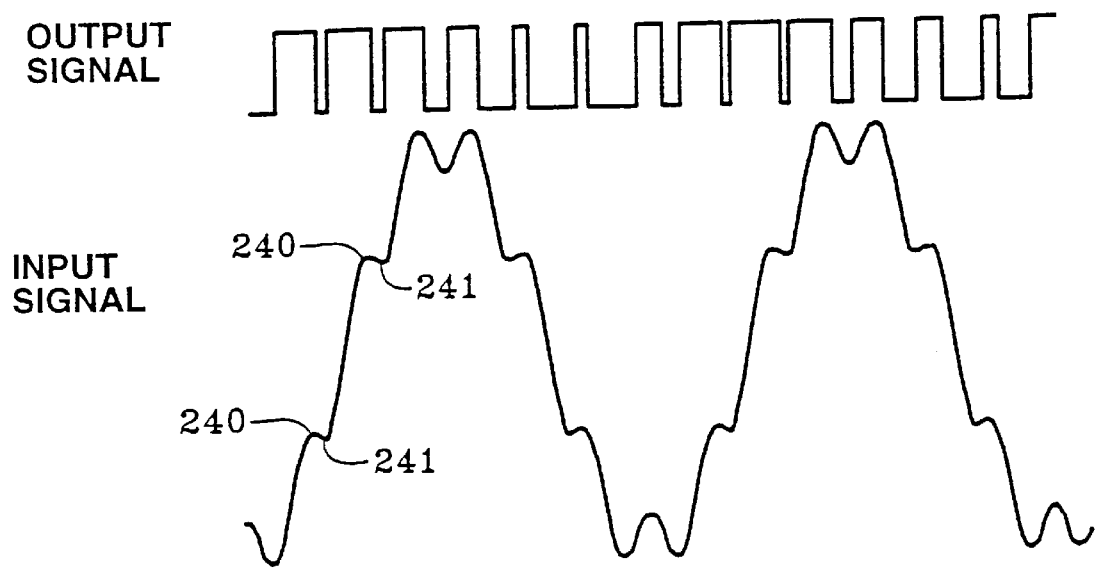
FIG. 18 shows a representative example of the respective signals at the input and the output of the FIG. 16 peak detector.

FIG. 18 shows the output signal of the FIG. 16 circuit compared with a typical input signal. The input signal can be regarded as a sinusoidal signal with a high frequency but a low amplitude superimposed on high amplitude noise causing large variations in the signal amplitude. Despite these variations, the change in the direction of the input signal at each positive peak 240 or each negative peak 241 is marked by a change in the direction of the output signal. The output signal can be used by the counter 204 to deliver the number of pulses and therefore the volume of gas. Knowing the time between two pulses, it is also a very simple matter to obtain the value of the gas flowrate.

The diameter of the main passages 12, 14 is slightly less than the width of the plate 10 and said passages are offset in the direction of flow of the gas. The passages are as close as possible to the leading edge 10c of said plate 10 to recover the best possible information on the signal. The passages also filter all the noise accompanying the signal because of the viscous forces acting on the gas in said passages and as a result the signal/noise ratio is improved.

For reasons associated with the quality of the information recovered by the plate 10 and the sensor, the transverse dimension l of the upstream face 7a of the first part 7 of the downstream obstacle 6 must be in the range 0.8d to 1.2d. For example, it is equal to d. If it is greater than 1.2d the plate 10 recovers hardly any signal. On the other hand, if it is less than 0.8d the signal recovered by the plate 10 is full of errors.

In another embodiment of the invention (not shown in the figures) the means for detecting the signal corresponding to the oscillations of the vortices and for deducing the volume of gas therefrom include two ultrasonic transducers downstream of the double obstacle 4, 6 and attached to the walls of the pipe portion 2 at diametrically opposite points (in this embodiment there is no need for any plate like that described above). One of the transducers outputs an ultrasonic signal that is modulated by the oscillations of the vortices, picked up by the other transducer and demodulated to deduce the oscillation frequency and thus the flowrate and the volume of gas.

The Applicant has found that the oscillation frequency obtained with the vortex gas meter of the invention is lower than that obtained with a meter having only one obstacle. The speed profile of the flow of gas immediately upstream of the upstream obstacle 4 is not completely flat (see FIG. 4) and has a boundary layer near the periphery of the pipe portion 2. When the flow of gas shown on the left in FIG. 4 encounters the upstream obstacle 4 a shear layer is formed on alternate sides of said upstream obstacle which forms main vortices downstream of the downstream obstacle 6.

Figure 4:
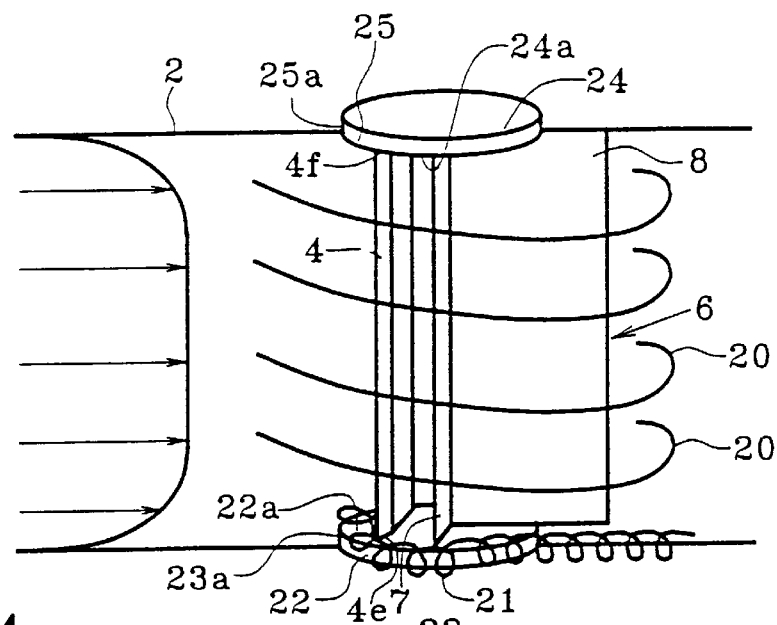
FIG. 4 is a diagrammatic perspective view of part of a second embodiment of the invention showing the vortex gas meter from FIGS. 1 to 3 fitted with means for reducing the effect of turbulence caused by permanent fluid vortices generated by part of the fluid flow encountering the upstream obstacle.

However, the boundary layer of the flow of gas creates a permanent secondary vortex 21 on encountering the obstacle 4. This vortex is formed at each of the longitudinal ends 4e and 4f of the upstream obstacle 4 and disrupts the formation of the main vortices 20. FIG. 4 shows only one vortex.

Figure 5:
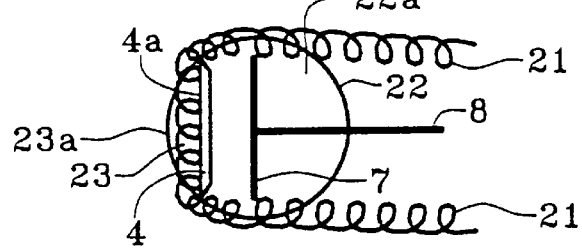
FIG. 5 is a diagrammatic view of the means in accordance with the invention shown in FIG. 4 in section on a plane parallel to the plane of FIG. 1.
Figure 6:
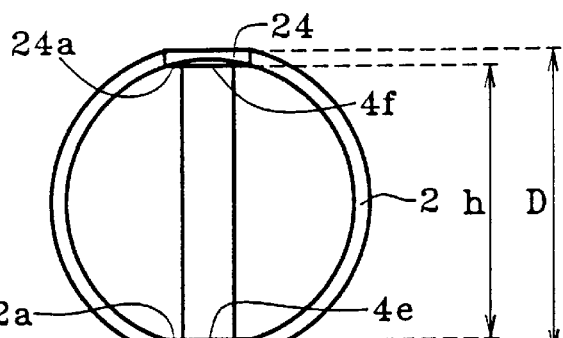
FIG. 6 is a diagrammatic view of the means in accordance with the invention shown in FIGS. 4 and 5 in section on a plane perpendicular to the axis of symmetry of the pipe.

In a second embodiment of the invention shown in FIGS. 4 to 6 the vortex gas meter includes means 22, 23, 24, 25 for reducing the effect of the turbulence caused by the secondary vortices 21.

These means are in the form of two parallel bases 22, 24 each having at least one larger face 22a, 24a perpendicular to the longitudinal dimension of the upstream obstacle 4 and the downstream obstacle 6. Each base 22, 24 is disk-shaped with a given thickness or longitudinal dimension and a diameter greater than the maximum transverse dimension d of the upstream obstacle 4 (FIG. 5). The two bases 22, 24 are attached to the inside wall of the pipe portion 2 of inside diameter D at diametrically opposite points so that one of the larger faces 22a of the base 22 faces towards the inside of said pipe portion and faces one of the larger faces 24a of the other base 24.

Each of the bases 22, 24 is partly accommodated in the pipe portion 2, as shown in FIG. 6, so that part of the maximum thickness e of the base, less than the total thickness of said base projects inside said pipe portion 2. The thickness e lies in the range 0.03D to 0.05D so that the projecting part of these bases faces the boundary layer of the flow of gas. If the thickness e is less than 0.03D the effect of the turbulence caused by the secondary vortices 21 is not reduced sufficiently. on the other hand, if this thickness is greater than 0.05D the flow of the gas may be impeded by the projecting part of the bases 22, 24 which may disrupt the formation of the main vortices 20. The upstream obstacle 4 and the downstream obstacle 6 are each fixed by one of their opposite longitudinal ends 4e, 4f, 6e and 6f to each of the facing larger faces 22a, 24a of the bases 22, 24.

As shown in FIG. 5, the upstream obstacle 4 is mounted on the lower base 22 so that each base 22, 24 has a respective portion 23, 25 upstream of the upstream obstacle 4. The boundary layer of the flow of gas therefore encounters first a base portion 23 of the lower base 22 before encountering the upstream obstacle 4 and the effect of this is to weaken the permanent secondary vortex 21 which forms on encountering said upstream obstacle 4. Consequently, the interaction between this secondary vortex 21 and the main vortices 20 is reduced. The same phenomenon naturally occurs at the upper base 24.

Each base portion has an upstream end 23a, 25a at a distance from the upstream face 4a of the upstream obstacle 4 in the range 0.1d to 0.4d. For example, this distance is equal to 0.35d. If this distance is greater than 0.4d the secondary vortices 21 are weakened but can reform and again be strong enough to disrupt the main vortices 20. In this configuration the first part 7 of the downstream obstacle 6 is mounted substantially on the part of the base which has the largest diameter, in the direction transverse to the flow of the gas. This means that part of the length of the second part 8 of the downstream obstacle 6 projects downstream beyond the base (FIG. 5).

The Applicant has noted that it can also be advantageous in some cases to allow secondary vortices 21 to form and to provide downstream of the upstream obstacle 4 means 30, 32 for separating said secondary vortices from the main vortices.

Figure 7:
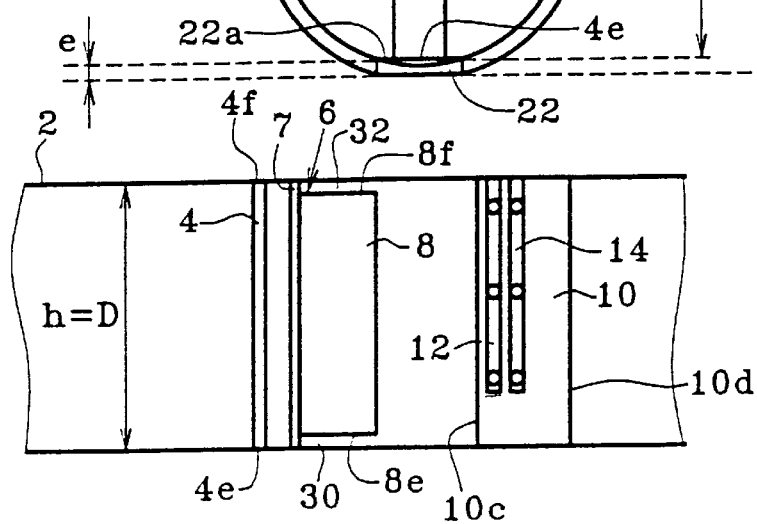
FIG. 7 is a diagrammatic view of a third embodiment of the invention in section on a plane containing the axis of symmetry of the pipe, showing the vortex gas meter shown in FIGS. 1 to 3 fitted with means for separating the oscillating fluid vortices from the permanent fluid vortices.

In a third embodiment of the invention, shown in FIG. 7, these means are in the form of two diametrally opposed passages 30, 32 in the pipe portion 2. Each of the passages 30, 32 is formed between one longitudinal end 8e, 8f of the second part 8 of the downstream obstacle 6 and the pipe portion 2. In this advantageous configuration the second part 8 of the downstream obstacle 6 has a longitudinal dimension or height less than the longitudinal dimension h of the first part 7 of said downstream obstacle.

When the boundary layer of the flow of gas encounters the upstream obstacle 4 strong secondary vortices form at the opposite longitudinal ends 4e and 4f of said upstream obstacle 4 and propagate in the direction to the main vortices. However, the formation of the main vortices causes a pressure drop which tends to entrain the secondary vortices towards the second part 8 of the downstream obstacle 6 towards the lower passage and upper passage 32, which prevents said secondary vortices interacting with said main vortices and so disrupting detection of the signal. Each passage 30, 32 is substantially rectangular in shape, for example, with the longitudinal dimension in the range D/40 to D/20. For example, it is equal to D/36.

If the longitudinal dimension of each passage 30, 32 is greater than D/20 the recirculation phenomenon that occurs opposite the larger faces 8a, 8b of the second part 8 of the downstream obstacle may be impeded and the formation of the main vortices may be compromised. On the other hand, if the longitudinal dimension is less than D/40 the effect of the pressure drop on the secondary vortices is of reduced benefit and the interaction between the secondary vortices and the main vortices is too strong.

In a fourth embodiment of the invention, shown in FIG. 8, it can be advantageous to combine the means 22, 24 to reduce the effect of the turbulence caused by the secondary vortices 21, as described with reference to FIGS. 4 to 6, and the means 30, 32 for separating said secondary vortices 21 from the main vortices 20, as described with reference to FIG. 7. The effect of combining these means is to reduce significantly the interaction between the secondary vortices 21 and the main vortices 20.

Figure 9:
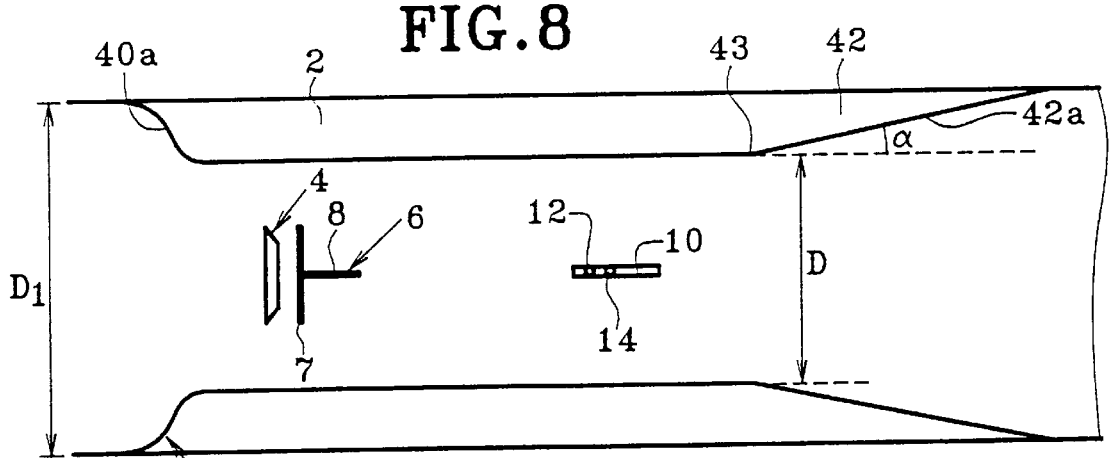
FIG. 9 is a diagrammatic view of a fifth embodiment of the invention in section on a plane containing the axis of symmetry of the pipe, showing the vortex gas meter shown in FIGS. 1 to 3 in a profiled pipe.

FIG. 9 shows a fifth embodiment of the invention and in the following description the same reference numbers are used as in the previous figures. The vortex fluid meter includes two obstacles 4 and 6 and the plate with its longitudinal passages 12, 14 connected to a sensor in the manner previously described. In this embodiment the pipe portion 2 of diameter D in which the two obstacles 4 and 6 and the plate 10 are disposed is connected at the upstream end to an upstream pipe portion 40 whose internal profile has a varying diameter which increases in the upstream direction to a value D1, which is the diameter of the main pipe. The upstream pipe portion 40 has an inside wall 40*a* at an angle to the direction of flow of the gas varying continuously from the intersection of said internal wall with the pipe portion 2 of inside diameter D, at which intersection said angle has a null value, to the place at which the upstream pipe portion 40 has an inside diameter equal to D1, where this angle again has a null value.

This configuration is entirely advantageous given that the flow of gas from the upstream side of the meter encounters no sharp edges on entering said meter and so is not disrupted by the generation of turbulence. The flow therefore accelerates in the pipe portion 2 of inside diameter D with the result that the profile of the speed of flow is closer to the turbulent regime and better stabilized. Consequently, at low Reynolds numbers of the flow of gas the nature of the shear layer that forms at the upstream obstacle departs from the laminar regime.

As shown in FIG. 9, the inside wall 40*a* of the upstream pipe portion 40 has in a plane parallel to the direction of flow of the gas a local profile formed in upstream to downstream succession by two circular arcs with the concave sides facing in opposite directions and merging at a point. Note that the corresponding circles do not necessarily have the same radius (they do have the same radius in FIG. 9). The local interior profile can also be part of a sinusoidal curve, but this variant is now shown.

The reduced diameter D of the pipe portion 2 lies in the range 60% to 90% of the diameter D1 of the main passage. If D is less than 60% of D1 the head loss is unacceptable and the oscillation frequency is too high to be detected by simple means. Also, for a value of D greater than 90% of D1 the flow of gas is not sufficiently accelerated.

The diameter D is preferably in the range 70% to 80% of the initial diameter D1. For example, it is equal to 72% of D1. The pipe portion 2 of inside diameter D has a length in the range 1.5 to 3 times said diameter D. For example, it is equal to 2D. This characteristic provides sufficient room for oscillating vortices to form and makes the gas meter compact.

In the pipe portion 2 of inside diameter D the upstream obstacle 4 is near the upstream pipe portion 40 to leave sufficient space downstream for the formation of the oscillating vortices. To be more precise, the upstream face 4*a* of the upstream obstacle 4 is at a distance from the upstream pipe portion 40 in the range 0.5D1 to D1. For a distance less than 0.5D1 the flow of gas reaching the upstream obstacle 4 has a speed profile that is not yet stabilized. Conversely, if the distance is greater than D1 the speed profile of the flow of gas develops a boundary layer that can induce strong secondary vortices which can disrupt the (main) oscillating vortices and the gas meter is not compact.

The pipe portion 2 of inside diameter D is joined at the downstream end to a downstream pipe portion 42 whose inside wall 42*a* is at a constant angle a to the direction of flow of the gas. The two pipe portions 2 and 42 join at a sharp edge 43. The downstream pipe portion 42 has a frustoconical inside wall 42*a* which extends from the sharp edge 43 to the main passage of diameter D1. Because of the sudden expansion of the pipe at a given angle after the straight pipe portion 2 in which the oscillating vortices form, the speed of the gas is reduced and its pressure is increased. The Applicant has found that this characteristic of the invention causes separation of the flow of gas at and downstream of the sharp edge 43 and so generates a pressure barrier at the exit from the pipe portion 2.

The function of this pressure barrier is to confine the gas vortices inside the pipe portion 2 so that the size of said vortices can be kept the same, so that the Strouhal number is constant, especially for low Reynolds numbers, and so that the oscillation frequency is directly proportional to the speed of the gas. The expansion angle of the downstream pipe portion 42 must be carefully chosen to keep the pressure to an acceptable value. The angle a is usually in the range 9 degrees to degrees and preferably in the range 10 degrees to 15 degrees. It is equal to 10.78 degrees, for example. An expansion angle greater than 20 degrees would cause intense recirculation of gas and the induced variation in the speed of the gas would increase its turbulence and not create an effective pressure barrier to maintain the size of the vortices constant. For an expansion angle less than 9 degrees the pressure would increase gradually along the downstream pipe portion 42 and would be insufficient for controlling the size of the vortices.

Figure 8:
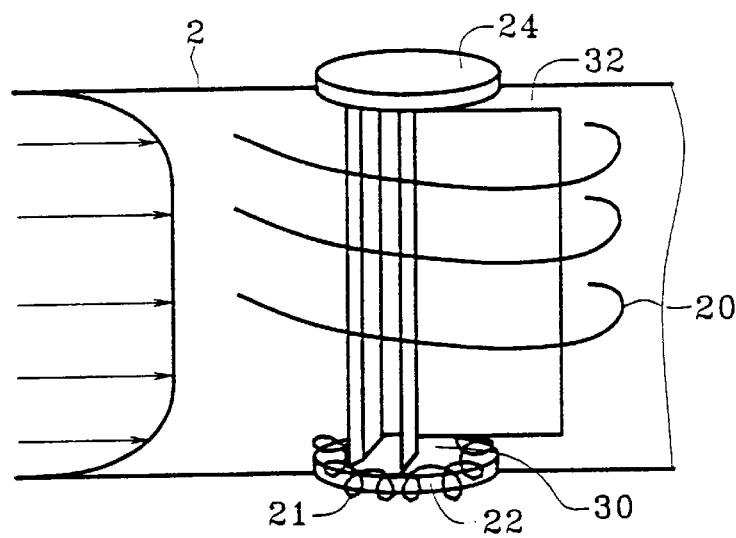
FIG. 8 is a diagrammatic perspective view of part of a fourth embodiment of the invention showing the vortex gas meter shown in FIGS. 1 to 3 fitted with the means shown in FIGS. 4 and 7, respectively.

In a sixth embodiment of the invention it is possible and highly advantageous to combine the characteristics of the vortex gas meter from FIG. 9 with those of the meter from FIG. 8. This yields the vortex gas meter shown in FIG. 10 with upstream obstacle 4 and downstream obstacle 6 mounted at their opposite longitudinal ends 4*e*, 4*f*, 6*e*, 6*f* on two bases 22, 24 partially embedded in the straight pipe portion 2 to reduce the effect of the turbulence created by the permanent secondary vortices generated when the boundary layer of the flow encounters the upstream obstacle 4.

The second part 8 of the downstream obstacle 6 has a longitudinal dimension less than the longitudinal dimension h of the first part 7 in order to provide a lower passage 30 and an upper passage 32 between said second part 8 of the downstream obstacle 6 and the pipe portion 2 of inside diameter D, these substantially rectangular passages enabling separation of the main vortices and the secondary vortices.

A plate 10 with longitudinal passages 12, 14 connected to a sensor (not shown), for example a thermal sensor, for detecting the signals corresponding to the oscillations of the main vortices is provided in the pipe portion 2 of inside diameter D, on the downstream side of the obstacles.

As previously described the sensor is connected to the electronic circuit shown in FIGS. 15 and 16 which deduces the volume of gas from the detection of the differential pressure. The pipe portion 2 is connected at the upstream end to an upstream pipe portion 40 which is profiled to accelerate the gas without disturbing the flow and at the downstream end to a downstream pipe portion 42 which has a frustoconical inside shape with a sharp edge 43 where it merges with said pipe portion 2, the effect of which is to create a pressure rise which confines the main vortices in the straight pipe portion.

A gas meter of this kind measures gas volumes for very low Reynolds numbers, down to 3,700, with a dynamic range of 30:1 and with a relative accuracy of 1%. The Reynolds number is evaluated for the flow of gas in the pipe of diameter D1. To show the advantages of the vortex fluid meter of the present invention the Applicant has carried out tests, with the results shown in FIGS. 13 and 14.

Figure 10:
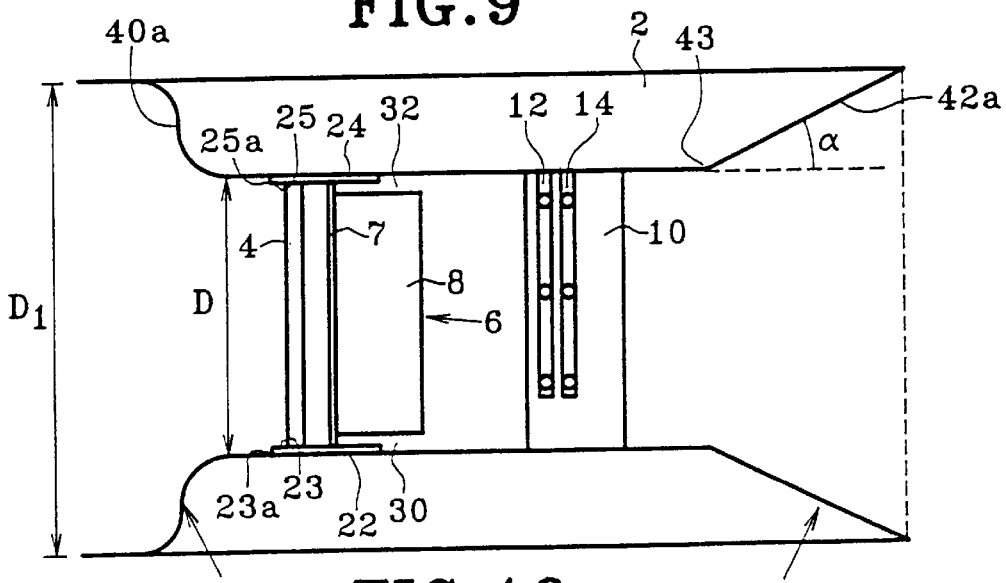
FIG. 10 is a diagrammatic view of a sixth embodiment of the invention in section on a plane containing the axis of symmetry of the pipe and perpendicular to that of FIG. 9, showing the vortex gas meter shown in FIG. 9 fitted with the means shown in FIGS. 4 and 7, respectively.
Figures 11, 12:
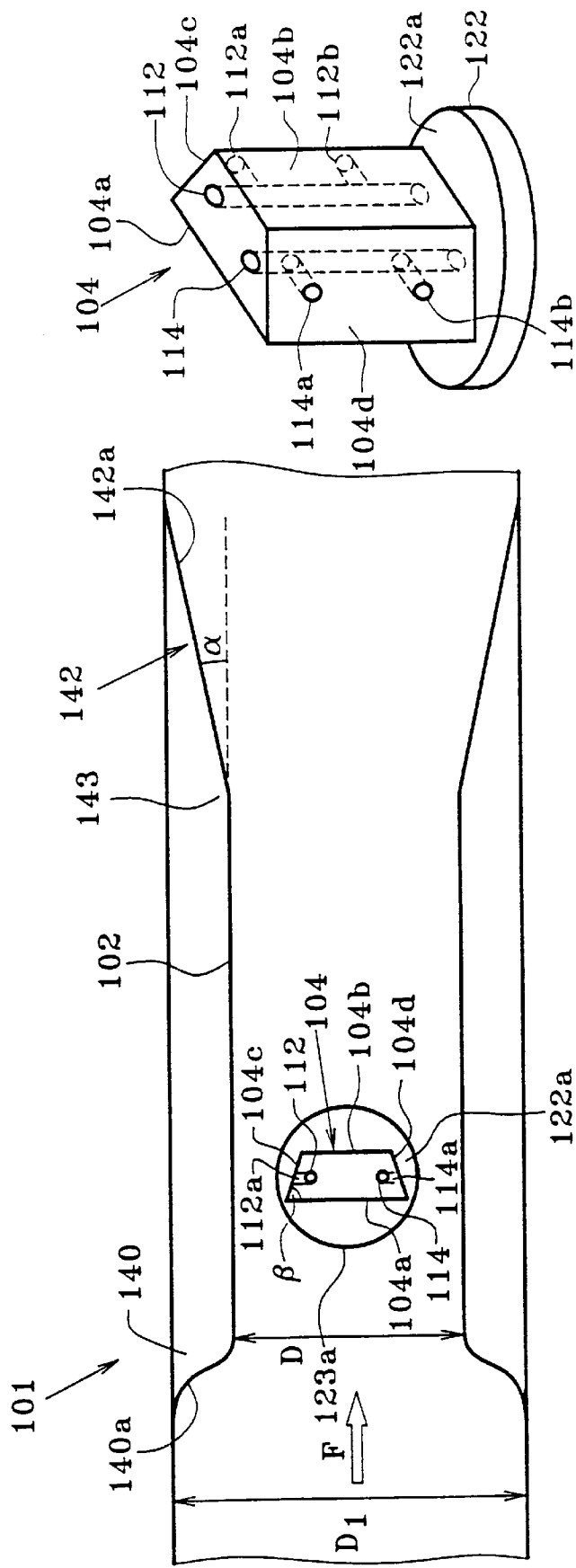
FIG. 11 is a diagrammatic view of a vortex gas meter including an obstacle in a profiled pipe similar to that of FIG. 9 in section on a plane containing the axis of symmetry of the pipe.
FIG. 12 is a diagrammatic perspective view of the obstacle of the vortex gas meter shown in FIG. 11.

A first test was carried out on two vortex gas meters in succession, the first of which is shown in FIGS. 11 and 12 and the second of which is shown in FIG. 10. The diameters D1 of the two pipes were equal to 100 mm. The meter of FIGS. 11 and 12 differs from that of FIG. 10 in that it includes only one obstacle that is a different size adapted to generate oscillating vortices and in that the means for detecting the signal corresponding to the oscillations of said vortices and for deducing the volume of gas therefrom are attached to said obstacle.

Apart from these differences, everything stated above regarding the profiled pipe, the position of the obstacle in the pipe, the bases and their location relative to said pipe and said obstacle remains valid and will not be repeated hereinafter. The numbers identifying the various component parts in FIGS. 11 and 12 are the same as those for the corresponding parts in previous figures but increased by 100.

The vortex gas meter 101 has a pipe portion 102 in which is placed an obstacle 104. The obstacle 104 has an upstream face 104a and a downstream face 104b which are plane and parallel, said upstream face 104a being larger than said downstream face 104b. The plane of each of these two faces is perpendicular to the direction of flow of the gas. The obstacle 104 also has two symmetrical lateral faces 104c and 104d at a constant angle β to the upstream face 104a so that the transverse section of said obstacle is trapezoidal in shape with the base on the upstream side.

FIGS. 11 and 12 show that the means for detecting the signal corresponding to the oscillations of the vortices and for deducing therefrom the volume of the gas include two parallel longitudinal main passages 112 and 114 in the obstacle 104 near the lateral faces 104c and 104d of said obstacle. These passages 112 and 114 are symmetrical about a median plane containing the axis of symmetry of the pipe and perpendicular to the plane containing the transverse section of the obstacle 104. The aforementioned means also include a plurality of secondary passages, for example two per main passage (112a, 112b, 114a, 114b) and also evenly spaced along the longitudinal dimension of the main passages 112 and 114, perpendicular to said main passages. These secondary passages connect the main passages to the lateral faces 104c and 104d of the obstacle 104. The secondary passages 112a, 112b, 114a, 114b have a diameter substantially equal to that of the main passages. Each of the main passages 112 and 114 is connected to a sensor (not shown), for example a heat sensor, to detect the flow caused by the differential pressure induced in said main passages by the separation of the vortices.

A conventional electronic circuit as shown in FIGS. 15 and 16 deduces the volume of gas from the detection of this differential pressure as already explained. The obstacle 104 is mounted on two circular bases 122 and 124 of which only the lower base 122 is shown in FIGS. 11 and 12. The upstream face 104a of the obstacle 104 is at a distance of 0.35d from the upstream end 123a (125a) of the portion 123 (125) of the base 122 (124) upstream of said upstream face 104a. The angle β between the lateral faces 104c and 104d of the obstacle 104 and the upstream face 104a of said obstacle is equal to 4 degrees.

The test carried out on these two meters consisted in determining the relative error in the determination of the volume of gas flowing through each of said meters relative to a calibration meter for flowrates in a range from 20 m³/h to 600 m³/h corresponding to a range of Reynolds numbers in the range 3,700 to 111,900.

Figure 13:
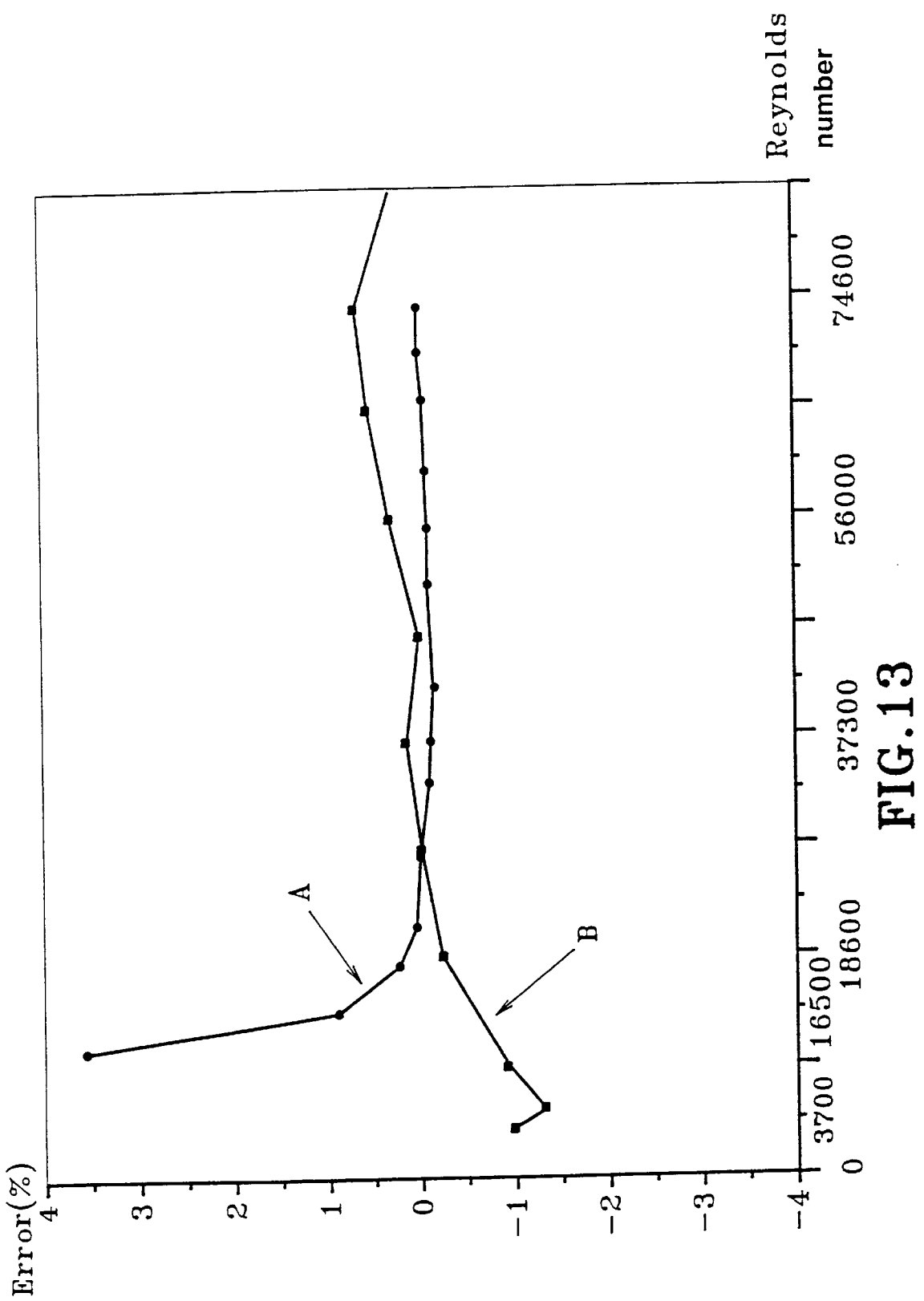
FIG. 13 is a graph showing respective calibration curves for the vortex gas meter of FIGS. 11 and 12(A) and the vortex gas meter of FIG. 10(B)

FIG. 13 shows for each of the gas meters the percentage relative error as a function of the Reynolds number and curves A and B are the respective calibration curves for the meter of FIG. 11 and that of FIG. 10.

It is clear that the FIG. 10 gas meter (double obstacle) reliably measures the volume of gas for low Reynolds numbers (down to 3,700) and that the FIG. 11 meter (single obstacle) cannot measure the volume of gas reliably for a Reynolds number less than 16,500.

Figure 14:
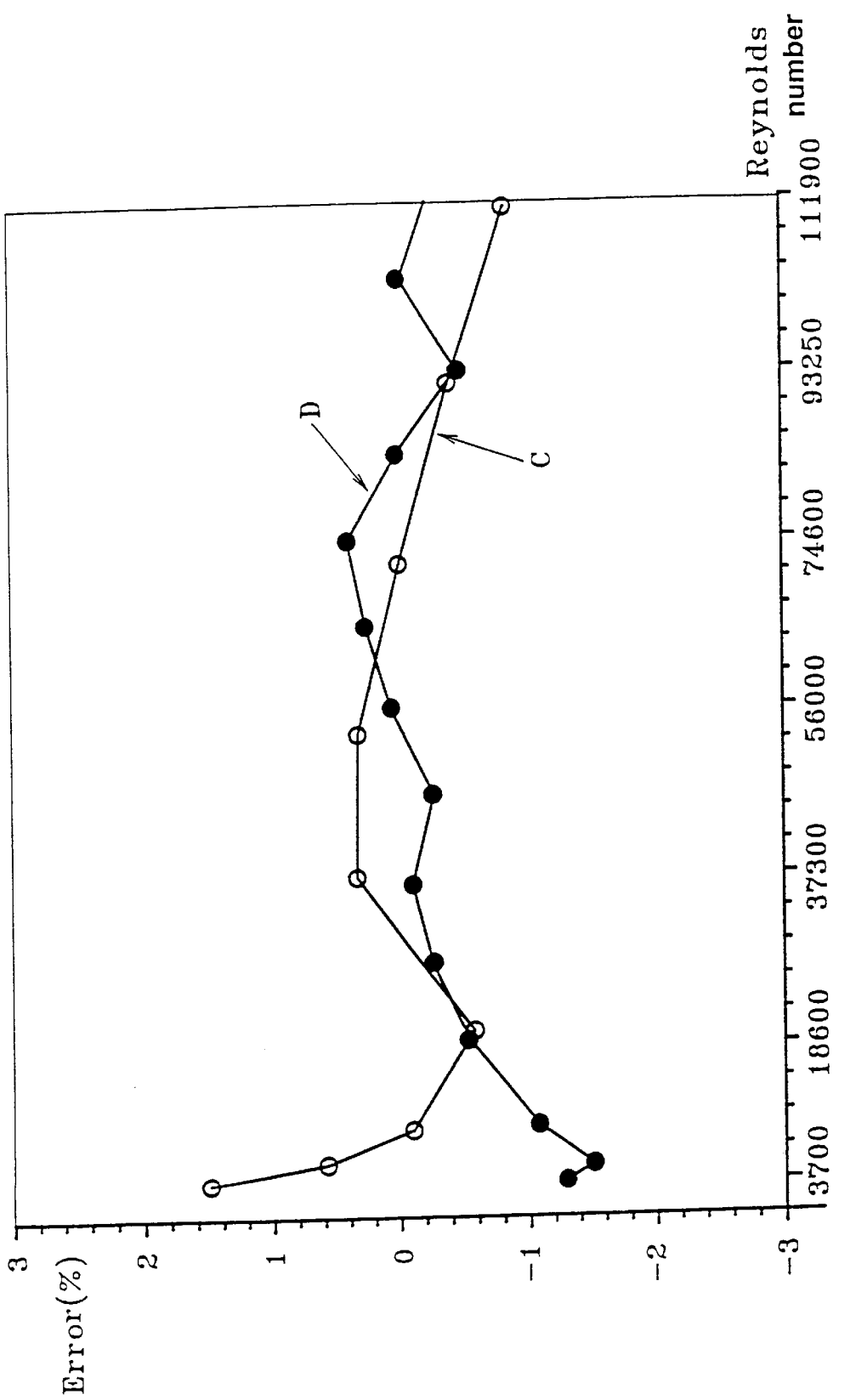
FIG. 14 is a graph showing respective calibration curves for the vortex gas meter of FIG. 8(C) and the vortex gas meter of FIG. 10(D)

FIG. 14 shows the results of another test of the same type which consisted in comparing two gas meters of the invention, one as described with reference to FIG. 8 and the other as described with reference to FIG. 10.

The respective calibration curves C and D obtained for the FIG. 8 and FIG. 10 meters are seen to be satisfactory and indicate that said meters have good linearity.

The Applicant has nevertheless found that for Reynolds numbers below 18,600 the noise affecting the FIG. 8 meter is too high in comparison with the signal corresponding to the oscillations of the vortices.

On the other hand, placing the double obstacle in a profiled pipe improves very significantly the signal/noise ratio for Reynolds numbers below 18,600 and therefore requires only simple electronic means for deducing the volume of gas from the detected signal.

The embodiment of the invention described with reference to FIG. 10 is therefore highly advantageous as it produces a very strong and stable signal so that the volume of gas can always be measured, even for very low Reynolds numbers (in the order of 3,700).

We claim:

1. A vortex fluid meter including:

a pipe portion of constant inside diameter D in which the fluid flows, at least two obstacles, i.e. an upstream obstacle and a downstream obstacle disposed in the middle of the fluid flow in said pipe portion and adapted to generate main fluid vortices in an oscillatory manner, each of said obstacles having a generally elongate shape with longitudinal and transverse dimensions perpendicular to the direction of flow of the fluid, and means for detecting the signal corresponding to the oscillations of said vortices and for deducing therefrom the volume of fluid, characterized in that the upstream obstacle of longitudinal dimension h has two larger faces perpendicular to the direction of flow of the fluid and spaced by a distance t, an upstream face of transverse dimension d greater than the transverse dimension of the downstream face and two symmetrical smaller lateral faces each at an angle β substantially between 30 and 70 degrees, to said upstream face, the downstream obstacle being in two parts joined together in a T-shape configuration, the first part with longitudinal dimension h and transverse dimension l having two parallel larger faces, i.e. an upstream faceparallel to the downstream face of said upstream obstacle and at a distance $d_1$ from the latter and a downstream face, and two smaller faces, the second part having two larger faces with the same dimensions and parallel to the direction of flow of the fluid and two parallel smaller faces with the same dimensions and perpendicular to the direction of flow of the fluid.

2. A vortex fluid meter according to claim 1 characterized in that the ratio d/t lies in the range 4 to 8.

3. A vortex fluid meter according to claim 2 characterized in that the distance $d_1$ lies in the range d/4 to 3d/4.

4. A vortex fluid meter according to claim 3 characterized in that the width 1 lies in the range 0.8d to 1.2d.

5. A vortex fluid meter according to claim 4 characterized in that the ratio d/D lies in the range 0.15 to 0.3.

6. A vortex fluid meter according to claim 1 characterized in that the larger faces of the first part of the downstream obstacle are separated by a distance in the range 0.02d to 0.08d.

7. A vortex fluid meter according to claim 6 characterized in that the smaller faces of the first part of the downstream obstacle are parallel.

8. A vortex fluid meter according to claim 7 characterized in that the smaller faces of the second part of the downstream obstacle have a transverse dimension in the range 0.02d to 0.08d.

9. A vortex fluid meter according to claim 8 characterized in that each of the two larger faces of the second part of the downstream obstacle has a dimension parallel to the direction of flow of the fluid in the range 0.8d to 1.2d.

10. A vortex fluid meter according to claim 1 further including means for reducing the effect of turbulence caused by permanent fluid vortices generated by part of the fluid flow corresponding to the boundary layer of the latter encountering the upstream obstacle.

11. A vortex fluid meter according to claim 10 characterized in that the means for reducing the effect of turbulence caused by permanent fluid vortices comprise two bases each having at least one larger face perpendicular to the longitudinal dimension of the upstream obstacle and the downstream obstacle and each of said bases is attached to the pipe portion in such a way as to have a maximum longitudinal dimension or thickness e facing the boundary layer of the flow of fluid, said upstream obstacle and downstream obstacle being fixed by one of their opposite longitudinal ends to each larger face of a base in such a way that each base has a portion upstream of the upstream obstacle.

12. A vortex fluid meter according to claim 11 characterized in that the maximum thickness e of each base lies in the range 0.03D to 0.05D.

13. A vortex fluid meter according to claim 11 characterized in that each base portion has an upstream end at a distance from the upstream face of the upstream obstacle in the range 0.1d to 0.4d.

14. A vortex fluid meter according to claim 1 further including means for separating the main oscillatory fluid vortices from the permanent secondary fluid vortices generated by part of the fluid flow corresponding to the boundary layer of the latter encountering the upstream obstacle.

15. A vortex fluid meter according to claim 14 characterized in that the means for separating the main oscillatory fluid vortices from the secondary fluid vortices are formed by two passages between the second part of the downstream obstacle and the pipe portion of inside diameter D, on either side of the opposite longitudinal ends of said second part which are spaced by a distance less than h.

16. A vortex fluid meter according to claim 15 characterized in that each passage has a maximum longitudinal dimension in the range D/40 to D/20.

17. A vortex fluid meter according to claim 1 characterized in that the pipe portion of inside diameter D is connected at the upstream end to an upstream pipe portion whose inside diameter increases progressively in the upstream direction to a value D1 and having an inside wall at a continuously varying angle to the direction of flow of the fluid, said angle having a null value at places in the pipe where the diameter of said upstream portion is respectively equal to D and to D1, and is connected at the downstream end to a downstream pipe portion having an inside wall which diverges sharply at a constant angle $\alpha$ to the direction of flow of the fluid in the range 9 degrees to 20 degrees, changing from the inside diameter D to the diameter D1.

18. A vortex fluid meter according to claim 17 characterized in that the diameter D lies in the range 60% to 90% of the diameter D1.

19. A vortex fluid meter according to claim 17 characterized in that the pipe portion of inside diameter D has a length in the range 1.5 times to 3 times said inside diameter D.

20. A vortex fluid meter according to claim 17 characterized in that the upstream face of the upstream obstacle is at a distance from the upstream pipe portion in the range 0.5D1 to D1.

21. A vortex fluid meter according to claim 1 characterized in that the means for detecting the signal corresponding to the oscillations of the vortices and for deducing therefrom the volume of fluid include a plate disposed in the middle of the flow of fluid downstream of the downstream obstacle and in the pipe portion of inside diameter D, said plate having a longitudinal dimension D perpendicular to the direction of flow of the fluid and a constant rectangular cross-section defined by two lateral larger faces parallel to the direction of flow of the fluid and upstream and downstream smaller faces, two parallel longitudinal main passages formed in said plate near said upstream face, each main passage being connected to one only of said lateral faces by a plurality of evenly distributed perpendicular secondary passages, and a sensor connected to the main passages and to an electronic circuit for deducing the volume of fluid from said detected signal.

22. A vortex fluid meter according to claim 21 characterized in that the upstream face of the plate has a transverse dimension in the range 0.1 times to 0.4 times the transverse dimension d of the upstream face of the upstream obstacle.

23. A vortex fluid meter according to claim 21 characterized in that the upstream face of the plate is at a distance from the upstream face of the upstream obstacle in the range 3d to 7d.

24. A vortex fluid meter according to claim 22 characterized in that the main passages have a diameter slightly smaller that the transverse dimension of the upstream face of the plate and in that said main passages are offset in the direction of flow of the fluid.

25. A vortex fluid meter according to claim 21 characterized in that the sensor is a pressure sensor.

26. A vortex fluid meter according to claim 21 characterized in that the sensor is a heat sensor.

* * * * *